Patented May 20, 1952

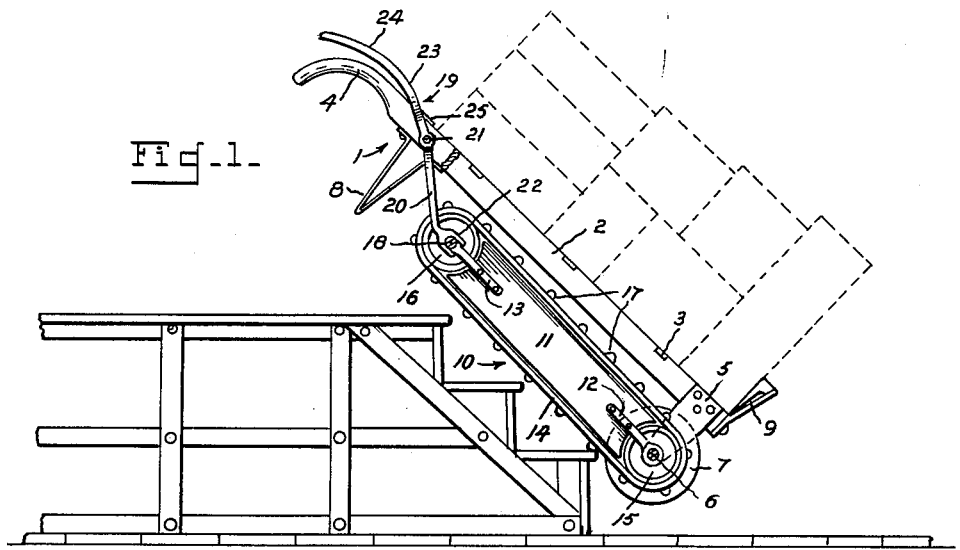
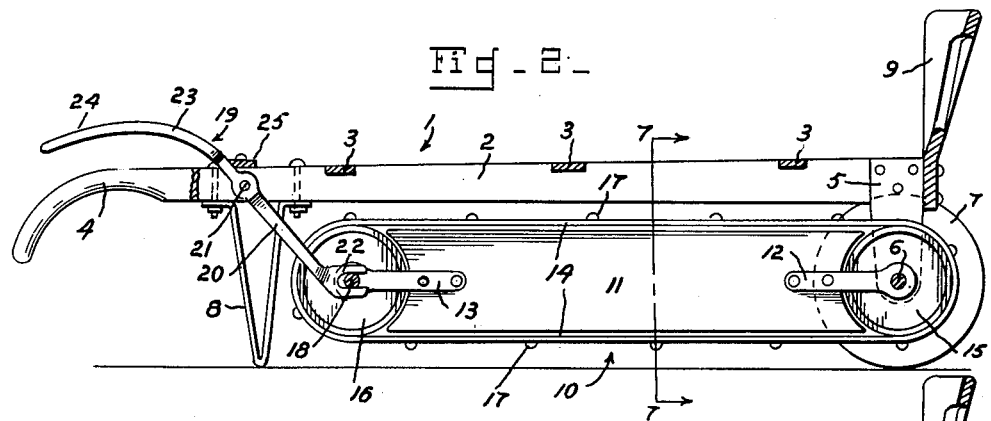
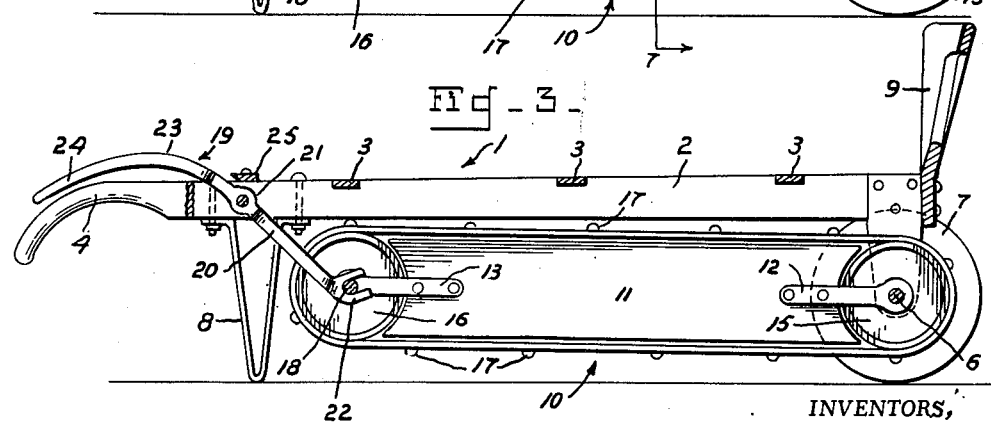

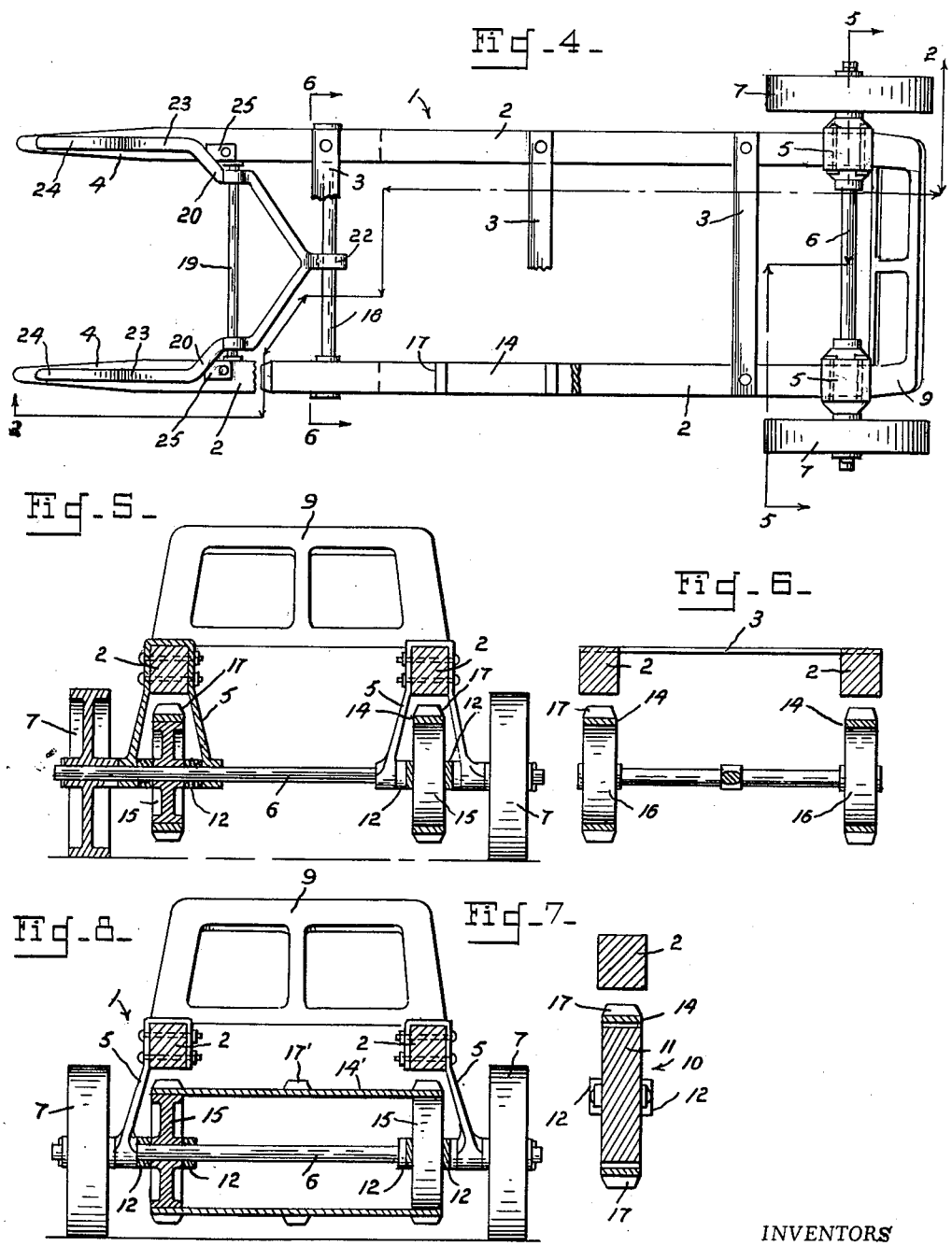

2,597,532

UNITED STATES PATENT OFFICE 2,597,532

HAND TRUCK

Lawrence Richardson and Walker Scott Richardson, Cambridge, Mass.

Application June 15, 1949, Serial No. 99,267

9 Claims. (Cl. 280—5.22)

This invention relates to hand trucks of that type especially designed and adapted for conveying articles up and down over curbs and stairways, as well as along straight surfaces, and which embodies an auxiliary endless track device to assist and render easier the riding of the truck over a curb, steps or other obstructions.

One object of the invention is to provide a truck embodying an auxiliary track or tread device including an endless belt having knob-like projections, so arranged as to positively engage a step or like obstruction, in any angular position of the truck relative to such obstruction, and in such manner as to prevent the belt from sliding or skidding while permitting it to travel about its supports, whereby the truck may be readily controlled and more readily moved up or eased down over the obstruction.

Still another object of the invention is to provide braking means whereby the movements of the endless track may be arrested or governed to control the descent of the truck over the steps of a stairway or other like surface, so as to allow a loaded truck to be handled with safety and convenience.

Still another object of the invention is to provide a truck having an auxiliary tread device of the character set forth which is simple of construction and may be manufactured and sold at a comparatively low cost.

The invention consists of the novel features of construction, combination and arrangement of parts hereinafter more fully described and claimed, and shown in the accompanying drawings, in which:

Fig. 1 is a view partly in side elevation and partly in section of a hand truck equipped with the improved auxiliary tread device, showing the use of the latter in supporting and easing the truck down the steps of a stairway.

Fig. 2 is an irregular vertical longitudinal section taken on line 2—2 of Fig. 4, through the truck, showing the auxiliary tread device in normal position.

Fig. 3 is a longitudinal section of Fig. 2 through the truck showing the auxiliary tread device moved in braking position.

Fig. 4 is a top plan view of the truck with parts removed or shown in section to better show the relative arrangement of the parts of the truck frame and auxiliary tread devices.

Figs. 5 and 6 are cross-sections taken respectively, on lines 5—5 and 6—6 of Fig. 4.

Fig. 7 is a detail section on line 7—7 of Fig. 2, and

Fig. 8 is a cross section showing the use of a modified form of auxiliary tread device.

Referring now more particularly to the drawings, 1 represents a hand truck frame of any suitable or generally conventional type, shown in the present instance as comprising a pair of parallel longitudinal frame bars 2 connected at intervals by cross pieces 3, each of the bars having at its rear end a handle 4. At its forward end the truck is provided with brackets 5 carrying a transverse shaft 6 on which are mounted traction wheels 7 on which the truck with its rear end raised frfom the surface of the ground is adapted to be trundled. Legs 8 are provided at the rear end of the truck for supporting such end when the truck is at rest and disposed in a horizontal position. At the front of the truck frame is a lifting blade 9 which serves as an abutment to prevent a load from shifting forwardly off the truck.

Arranged beneath the side bars of the truck frame are auxiliary tread devices 10, which extend longitudinally between the shaft 6 and legs 8, and each of which comprises a frame member 11 carrying front and rear sets of brackets 12 and 13 and an endless tread band and belt 14 arranged to travel about the frame member and about pulleys 15 and 16 located at the front and rear ends thereof. The outer surface of the belt is provided with suitably spaced stop or brake knobs, cleats or projections 17.

The front brackets 12 engage the shaft 6 to pivotally support the front ends of the tread devices 10 therefrom, and the front pulleys 15 are journaled to rotate on said shaft, while the rear pulleys 16 are journaled on a transverse shaft 18 which is carried by the brackets 13 and connects the two tread devices 10 at their rear ends. The shaft 18 is free from connection with the main frame so that the rear ends of the devices 10 are allowed to float and may be swung upwardly or downwardly relative to the truck frame in which movements the devices 10 swing on the shaft 6 as an axis. These upward and downward swinging movements of the two tread devices 10 are controlled and the downward movement of said devices limited by a controlling and braking means which may be of any suitable construction but which, in the present instance, is shown in the form of a lever 19 comprising two front arms 20 pivotally mounted on a cross rod 21 and terminating at their forward ends in a forked portion 22 which engages the shaft 18. The lever 19 is also provided with two rear arms 23 which terminate in handles 24 disposed above the handles 4 of the truck frame. Stops 25 are provided on the bars 2 which lie in the path of the lever arms 23 and limit the downward movement of the lever arms 20, so that by gravity the two tread devices 10 will be normally disposed in the working position shown in Figs. 1 and 2 but by depression of the lever handles 24 may be swung upward to the position shown in Fig. 3.

The auxiliary treads are used to render easier the pull of the truck upward over a curb or the steps of a stairway or to ease the truck upward over a curb or the steps of a stairway or to ease the truck downward over the same. During normal operation the truck is lifted at its rear end and drawn rearwardly or propelled forwardly on the wheels 7. When, however, the truck is to be drawn upward or propelled downward over a step, curb or other like surface, the lower stretches of the belts 10 will engage the obstruction and serve as the traction agents, allowing the truck to be drawn up the steps or moved down the steps with ease and facility. Figure 2 shows the normal position of the auxiliary treads relative to the truck frame when the truck is at rest or being drawn or propelled by its wheels over a straight surface, while Figure 1 shows the auxiliary treads as arranged when easing the truck down the steps of a stairway, from which the operation of the auxiliary treads in drawing the truck upward over the steps or a curb will also be readily understood. In these operations of drawing the truck upward or letting it downward over steps or the like the knobs or cleats operate as tread or stud projections to enable a gripping action to be obtained and to prevent the truck form sliding or skidding. These knobs or cleats on the belts may be arranged in staggered relation to one another on the outer surface of each belt and may be so spaced or positioned that in any angular position to which the truck may be turned relative to the center of the stairway at least one of the projections on each belt will be in engagement with steps of the stairway to enable the truck to be properly guided and controlled.

It is desirable to provide means whereby the belts may be braked and their movements controlled to prevent the truck from getting out of control, especially when heavily loaded. To this end we pivotally mount the devices 10 so that said devices may be moved upward, as shown in Fig. 3, by means of the lever 19 so as to bring the upper stretches of the belts or the knobs thereon into frictional braking engagement with the undersides of the bars 2, acting as fixed braking surfaces, or into engagement with any types of fixed brake shoes which may be employed. This lever may be actuated by the hands of the operator engaging the truck handles 4 so that the truck may be manipulated at the same time that the lever is being operated to exert on the belt 14 a desired braking action, either to control the speed of movements of the belts or stop the movement thereof, thereby enabling even a heavily laden truck to be governed in its descent of a stairway so that its safe descent will be assured.

While we have shown the use of two narrow belts, one at each side of the truck, a single band or belt, of a width to extend across the underside of the truck, may be used. In Fig. 8 we have shown the use of a single belt 14', the outer surface of which is provided with knobs, cleats or other like projections 17' suitably arranged on said surface.

From the foregoing description, taken in connection with the drawings, the construction, mode of operation and advantages of our improved truck will be readily understood by those versed in the art without a further and extended description. It is to be understood, of course, that while we have shown certain means for carrying our invention into practical effect, we do not limit our invention thereto, as changes in the form, size, construction and arrangement of the parts, falling within the scope of the appended claims, may be made without departing from the spirit or sacrificing any of the advantages of the invention.

Having described our invention, what we claim is:

1. A hand truck comprising a main frame having a braking surface, wheeled supporting means at the forward end of the frame, and an auxiliary endless belt tread device pivotally mounted at its forward end on the main frame and free to float at its rear end for upward and downward braking and releasing movements relative to the main frame, and means for supporting the floating end of the tread device and moving it into and out of braking engagement with said braking surface.

2. A hand truck comprising a main frame having a brake surface, lifting handles at the rear end of the frame, wheeled supporting means at the front of the frame, an endless tread belt mounted on the main frame beneath the same and in rear of the wheeled supporting means and movable for a braking action into engagement with the braking surface, and means for moving the belt into engagement with the braking surface.

3. A hand truck comprising a main frame having wheeled supporting means and a brake surface, a travelable endless tread belt supported from the main frame and pivotally mounted for movement into and out of engagement with the brake surface, and means for swinging the endless tread belt into engagement with the brake surface.

4. A hand truck, comprising a wheeled main frame having a brake surface, an endless tread belt supported for travel beneath the main frame and for swinging movement toward and from said brake surface, and means for swinging the belt toward the brake surface to retard or arrest its travel and controlling its movement away from the brake surface.

5. A hand truck comprising a wheeled main frame having a brake surface, an endless tread belt supported for travel beneath the main frame and for swinging movement toward and from said brake surface, a lever mechanism mounted in the main frame for swinging the belt toward the brake surface to retard or arrest its travel and controlling its movement away from the brake surface.

6. A hand truck comprising a wheeled main frame having operating handles and a brake surface, an endless tread belt arranged beneath the main frame, a support for the belt about which the belt is mounted for travel, said support being pivoted at its forward end to the main frame and being free to float at its rear end to adapt the belt to be swung upward and downward toward and from the brake surface, and means for swinging the support and belt toward the brake surface and controlling the movement thereof away from the brake surface.

7. A hand truck comprising a wheeled main frame having operating handles and a brake surface, an endless tread belt arranged beneath the main frame, a support for the belt about which the belt is mounted for travel, said support being pivoted at its forward end to the main frame and being free to float at its rear end to adapt the belt to be swung upward and downward toward and from the brake surface, tread projections on the tread surface of the belt for supporting engagement with obstructions in the travel of the truck, and for braking engagement with said brake surface, and means accessible from the operating handles for swinging the support and belt toward the brake surface and controlling the movement thereof away from the brake surface.

8. A hand truck comprising a main frame including a pair of longitudinal frame bars, a transverse shaft at the front of the frame supported by the frame bars, supporting wheels mounted on the shaft, supports arranged beneath the frame bars in rear of and pivotally connected at their front ends to the shaft, a tread belt mounted for travel on each support, and means on the main frame and connected to the rear end of each support for swinging the support upward and downward so as to move the belt into and out of braking engagement with the frame bars.

9. A hand truck comprising a truck frame having handles at its rear end, a transverse shaft at the forward end of the frame, supporting wheels mounted on the shaft, an endless tread device arranged at each side of the frame beneath the frame in rear of the shaft, each tread device comprising a frame member pivotally mounted at its forward end on the shaft, and an endless tread belt mounted for travel on said frame member, and means mounted at the rear end of the truck frame and supporting the rear ends of the tread devices for movement from a position in which the belts are adapted to have free travel to a braking position in engagement with the truck frame, said means including operating means arranged in proximity to the handles at the rear end of the truck frame.

LAWRENCE RICHARDSON.
WALKER SCOTT RICHARDSON.

REFERENCES CITED

The following references are of record in the file of this patent:

UNITED STATES PATENTS

| Number | Name | Date |
|---|---|---|
| 1,105,379 | Schulze | July 28, 1914 |
| 2,132,069 | Hall | Oct. 4, 1938 |
| 2,193,283 | Harberson | Mar. 12, 1940 |
| 2,319,008 | McCormack | May 11, 1943 |
| 2,422,254 | Peronti | June 17, 1947 |
| 2,484,754 | Silva | Oct. 11, 1949 |